(12) United States Patent
Richert

(10) Patent No.: US 9,884,644 B2
(45) Date of Patent: Feb. 6, 2018

(54) METHOD FOR OPERATING A VEHICLE

(71) Applicant: DAIMLER AG, Stuttgart (DE)

(72) Inventor: Julien Richert, Stuttgart Vaihingen (DE)

(73) Assignee: DAIMLER AG, Stuttgart (DE)

( * ) Notice: Subject to any disclaimer, the term of this patent is extended or adjusted under 35 U.S.C. 154(b) by 36 days.

(21) Appl. No.: 15/109,208

(22) PCT Filed: Dec. 17, 2014

(86) PCT No.: PCT/EP2014/003396
§ 371 (c)(1),
(2) Date: Jun. 30, 2016

(87) PCT Pub. No.: WO2015/104044
PCT Pub. Date: Jul. 16, 2015

(65) Prior Publication Data
US 2016/0325783 A1    Nov. 10, 2016

(30) Foreign Application Priority Data

Jan. 9, 2014   (DE) ........................ 10 2014 000 266

(51) Int. Cl.
*B62D 15/02*          (2006.01)
*B60W 30/09*          (2012.01)
(Continued)

(52) U.S. Cl.
CPC ........ *B62D 15/025* (2013.01); *B60R 21/0134* (2013.01); *B60R 21/01542* (2014.10); *B60W 30/09* (2013.01); *B62D 15/021* (2013.01)

(58) Field of Classification Search
CPC .......... B60T 7/12; B60T 7/22; B60T 2201/08; B60T 2201/083; B60T 2201/087;
(Continued)

(56) References Cited

U.S. PATENT DOCUMENTS 7,893,819 B2   2/2011   Pfeiffer et al.
8,851,515 B2   10/2014  Fehring et al.
(Continued)

FOREIGN PATENT DOCUMENTS

DE   102011108870 A1   4/2012
DE   102010052412 A1   5/2012
(Continued)

OTHER PUBLICATIONS

German Examination Report created on Jul. 28, 2014 in related DE Application No. 10 2014 000 266.7.
(Continued)

*Primary Examiner* — Dale Moyer
(74) *Attorney, Agent, or Firm* — Patent Portfolio Builders PLLC

(57) ABSTRACT

When a vehicle passenger sitting on a vehicle seat or a body part of the vehicle passenger is moved away from a collision side of the vehicle by a passenger protection mechanism a reaction of a driver of the vehicle following the triggering of the passenger protection mechanism is monitored. If a steering movement implemented in an uncontrolled manner by the driver, resulting from an incorrect triggering of the passenger protection mechanism, is detected at least one intervention correcting the lane is implemented in such a way that the vehicle is guided back into its original lane.

16 Claims, 2 Drawing Sheets

Figure 1:
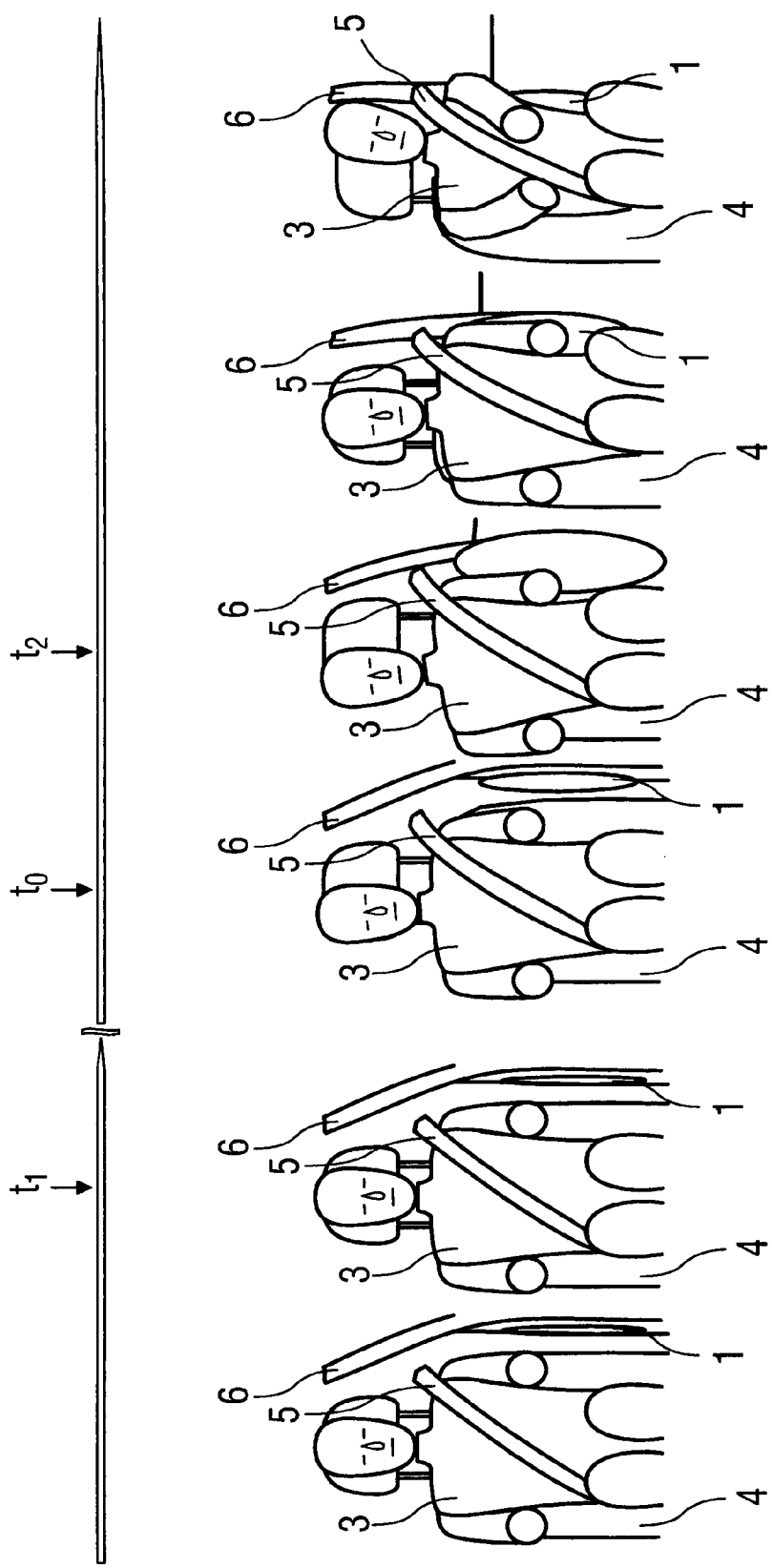

(51) Int. Cl.
   *B60R 21/015* (2006.01)
   *B60R 21/0134* (2006.01)

(58) Field of Classification Search
   CPC .... B60W 10/20; B60W 30/08; B60W 30/085;
       B60W 30/09; B60W 30/10; B60W 30/12;
       B60W 2030/082; B60W 2050/0071;
       B60W 2540/18; B60W 2540/26; B60W
       2710/20; B60W 50/0098; B60W 50/10;
       B60W 50/12; B62D 15/02; B62D 15/021;
       B62D 15/025; B62D 15/0255; G08G
       1/16; G08G 1/167
   See application file for complete search history.

(56) References Cited

U.S. PATENT DOCUMENTS

| | | | |
|---|---|---|---|
| 2006/0047388 A1* | 3/2006 | Oka | B60R 21/013 701/41 |
| 2006/0196715 A1* | 9/2006 | Fujishiro | B60N 2/0276 180/271 |
| 2007/0228713 A1* | 10/2007 | Takemura | B60R 22/46 280/753 |
| 2011/0054741 A1* | 3/2011 | Stabrey | B60T 8/1755 701/43 |
| 2014/0336880 A1* | 11/2014 | Freienstein | B60R 21/0132 701/45 |
| 2017/0015315 A1* | 1/2017 | Hattori | B60R 21/0132 |

FOREIGN PATENT DOCUMENTS

| | | |
|---|---|---|
| DE | 102012009833 A1 | 11/2012 |
| WO | 2006092431 A1 | 9/2006 |

OTHER PUBLICATIONS

International Search Report dated Mar. 16, 2015 in related International Application No. PCT/EP2014/003396.

Written Opinion dated Mar. 16, 2015 in related International Application No. PCT/EP2014/003396.

* cited by examiner

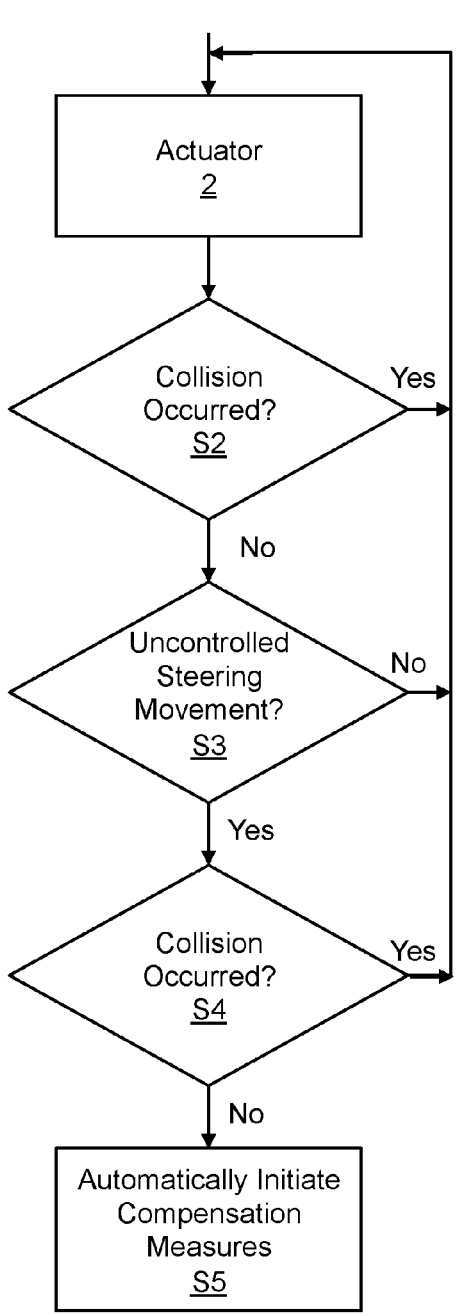
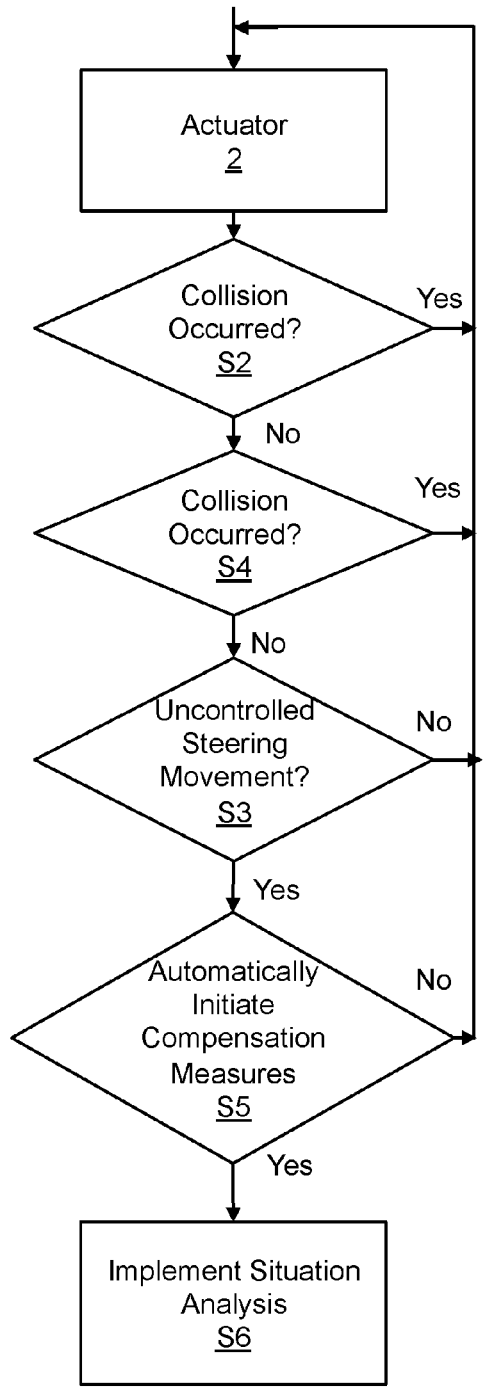
FIG 2
FIG 3

METHOD FOR OPERATING A VEHICLE

BACKGROUND AND SUMMARY OF THE INVENTION

Exemplary embodiment of the invention relate to a method for operating a vehicle having at least one passenger protection mechanism, which is controlled in the event of a detected collision that is imminent for the vehicle or in the event of a detected collision, wherein a vehicle passenger sitting on a vehicle seat or a body part of the vehicle passenger is moved by the triggered passenger protection mechanism.

In particular, the passenger could be moved away from a collision side of the vehicle if preventative side cushions, for example air cushions, are activated in the vehicle seat in order to bring the vehicle passenger from the danger zone in advance of a side collision and to impress a pulse (PRE-SAFE pulse side).

German patent document DE 10 2010 052 412 A1 discloses a method and a device to protect a vehicle passenger in a vehicle seat of a vehicle, in particular of a passenger motor vehicle. According to the method at least one protective element, which is arranged on the vehicle seat and is able to be triggered to protect the vehicle passenger located on the vehicle seat, is triggered in the event of an initiating collision or in the event of a collision. When the protective element is triggered, a movement pulse acting on the vehicle passenger or at least one body part of the vehicle passenger is exerted, due to which the vehicle passenger or at least one body part of the vehicle passenger is moved away from a collision section of the vehicle that is colliding or will collide with the object. Here, an intensity of the movement pulse is varied depending on a determined accident severity and/or a determined accident type.

A method to operate a vehicle having at least one passenger protection mechanism provides that the passenger protection mechanism is controlled in the event of a detected collision that is imminent for the vehicle or in the event of a detected collision, wherein a vehicle passenger sitting on a vehicle seat or a body part of the vehicle passenger is moved away from a collision side of the vehicle by the triggered passenger protection mechanism. According to the invention, a reaction of a driver of the vehicle following the triggering of the passenger protection mechanism is monitored and, in the case of a steering movement implemented in an uncontrolled manner by the driver, resulting from an incorrect triggering of the passenger protection mechanism, at least one intervention correcting the lane is implemented automatically in such a way that the vehicle is guided back into its original lane.

By virtue of the method, a steering movement implemented in a quick and uncontrolled manner due to an incorrect triggering of the passenger protection mechanism in shock reaction will be corrected by the automatic intervention, whereby the safety for the driver as a passenger and further passengers of the vehicle as well as for further road users is substantially increased. Due to the automatic steering intervention correcting the lane, the risk of a collision, for example with a vehicle in oncoming traffic, can at least be reduced.

In one embodiment, an individual wheel braking and/or a steering intervention in a direction contrary to the steering movement implemented in an uncontrolled manner is or are implemented automatically as an intervention correcting the lane. The steering intervention implemented in an uncontrolled manner in shock reaction can thereby be counteracted in order to be able to substantially rule out a collision, for example with oncoming traffic.

In order to determine whether an incorrect triggering of the passenger protection mechanism is present, a reaction of the driver is preferably monitored from the point in time of the triggering of the passenger protection mechanism. Therefore, an intervention correcting the lane can be implemented comparatively close in time to a shock reaction of the driver of the vehicle.

In a further embodiment, a steering wheel angle, an angle speed of the vehicle and/or an angle acceleration of the vehicle is or are continuously detected as a reaction of the driver. Due to this detected value or these detected values, a skittish and therefore uncontrolled steering wheel movement, a so-called slamming of the steering wheel, can be detected.

Preferably, detected values of the steering wheel angle, the angle speed and/or the angle acceleration are compared with a respective, stored threshold value to determine a steering movement implemented in an uncontrolled manner. The threshold value comparison provides a comparatively simple and secure way to determine whether a steering movement of the driver implemented in an uncontrolled manner is present.

In one possible embodiment of the invention, the automatically initiated intervention correcting the lane is implemented depending on determined environment information. It can thereby be determined in an advantageous manner whether the automatic intervention must occur abruptly, i.e. comparatively quickly, or potentially not at all in order to at least reduce the risk of a collision, for example with oncoming traffic.

In one possible development of the method the automatically initiated intervention correcting the lane is implemented depending on a detected lane width. Using the determined lane width it can be determined whether and how quickly the steering intervention correcting the lane must be implemented in order to be able to at least predominantly rule out the risk of an undesired leaving of the driver's lane.

In a further possible development, the automatically initiated intervention correcting the lane is implemented automatically depending on a determined criticality of a driving situation caused by the steering movement implemented by the driver. In other words, a situation analysis is implemented, by means of which it is determined whether it is required to implement the steering intervention correcting the lane. For example, in the scope of the situation analysis it is detected whether a vehicle is oncoming to the vehicle or not and whether, correspondingly, automatic reaction must be initiated.

BRIEF DESCRIPTION OF THE DRAWING FIGURES

Exemplary embodiments of the invention are explained below in more detail by means of drawings.

Here are shown:

FIG. 1 schematically, a time progression of a control of a passenger protection mechanism in a vehicle, FIG. 2 schematically, a first method progression for compensation of an incorrect triggering of the passenger protection mechanism and FIG. 3 schematically, a second method progression for compensation of an incorrect triggering of the passenger protection mechanism.

Parts corresponding to one another are provided with the same reference numerals in all figures.

DETAILED DESCRIPTION

FIG. 1 shows a time progression of a control of a passenger protection mechanism 1 in a vehicle (not depicted in more detail).

The vehicle comprises an environment sensor, which comprises a number of detection units arranged in and/or on the vehicle. Here, at least one detection unit, for example a radar-based sensor, is arranged on a respective vehicle side and which detects signals continuously. The signals are allocated to a control unit, wherein it is detected using the signals whether an object approaching the vehicle laterally is located on a collision course with the vehicle.

If it is determined that the object is located on a lateral collision course with respect to the vehicle, so a collision is imminent for the vehicle, a collision severity is predicted, for example, by using a relative speed and/or a speed of the object determined by means of the detected signals.

If the predicted collision severity exceeds a first threshold value stored in the control unit, an actuator 2 of the passenger protection mechanism 1 depicted schematically in FIG. 2 is controlled and the passenger protection mechanism 1 is triggered.

In a first drawing allocated to the time progression, a driver is depicted as a vehicle passenger 3 on a vehicle seat 4, wherein the vehicle passenger 3 has a safety belt 5 on.

It has been determined using signals of the detection units of the environment sensor system that a lateral collision of the vehicle is imminent for the vehicle, in particular on a driver side, at the predicted collision point in time $t_0$, wherein the predicted collision severity exceeds a predetermined first threshold value. The actuator 2 of the passenger protection mechanism 1 is controlled such that the passenger protection mechanism 1 is triggered.

The passenger protection mechanism 1 is a fillable air cushion arranged in a side panel of the vehicle seat (not shown in more detail) or in a trim part of a vehicle structure.

The air cushion as a passenger protection mechanism 1 is fluidically coupled to a gas generator, which can be activated as an actuator 2 by a pyrotechnic propulsion unit such that the air cushion as a passenger protection mechanism 1 is filled with a gas, for example air. The air cushion is thereby unfolded such that the vehicle passenger 3 is moved away from the collision side 6 of the vehicle and is accelerated in the direction of the vehicle center.

At a first point in time $t_1$, for example 200 milliseconds before the predicted collision point in time $t_0$, the passenger 3 begins to be pushed by the passenger protection mechanism 1, as is depicted in a second drawing of the time progression.

A maximum deflection of the air cushion as a passenger protection mechanism 1 and the thus caused acceleration of the vehicle passenger 3 in the direction of the vehicle center occurs at the collision point in time $t_0$, as is shown in a third drawing.

From a second point in time $t_2$, for example 10 milliseconds after the collision point in time $t_0$, a reduction of a movement energy of the vehicle passenger 3 begins using the passenger protection mechanism 1, which makes contact with the vehicle passenger 3, as is depicted in a fourth drawing.

In connection to the beginning of absorption, an intrusion of the object and an energy conversion into the vehicle side occur, as is shown in drawing 5, and a sixth drawing shows an end of an absorption phase.

With regard to the passenger protection mechanism 1, the danger exists that this, for example, is triggered due to an object incorrectly detected as a collision object, whereby a shock reaction of the driver as a vehicle passenger 3 can be caused. This shock reaction can be expressed in particular by a quick, uncontrolled steering movement, which can result in sudden lateral swinging out of the vehicle. A collision of the vehicle, for example with oncoming road users, could result from this undesired and uncontrolled steering movement.

A method according to the invention compensates for a consequence of an incorrect triggering of the passenger protection mechanism 1.

In FIG. 2, a first method progression for compensation of an incorrect triggering of the passenger protection mechanism 1 is depicted.

Due to detected signals of the environment sensor system, it has been determined that a lateral collision is imminent for the vehicle, wherein the collision severity determined by virtue of the detected signals exceeding a stored first threshold value such that a control signal for the ignition of the pyrotechnic propulsion unit of the gas generator as an actuator 2 of the passenger protection mechanism 1 is generated by the control unit and provided to the actuator 2. In a first method step S1, the actuator 2 of the passenger protection mechanism 1 is therefore ignited and, therefore, for example, the passenger protection mechanism 1 is triggered 200 milliseconds before the predicted collision point in time $t_0$.

In a second method step S2, a query as to whether the collision of the vehicle has taken place occurs, wherein for this purpose, for example, it is determined whether an acceleration threshold value is exceeded. If it is determined that no information is present with regard to an occurrence of the collision, in a third method step S3, a reaction of the driver as a vehicle passenger 3, in particular with regard to an uncontrolled steering movement carried out as a shock reaction, is monitored.

To determine whether an uncontrolled steering movement has been implemented, a steering wheel angle, an angle speed and/or an angle acceleration is or are continuously detected.

A threshold value is preferably deposited for each detected variable such that, in the event of exceeding the threshold value or the threshold values, a steering movement implemented in an uncontrolled manner can be concluded by the passenger 3.

Additionally, the signals detected using the detection units of the environment sensor system are evaluated continuously in the scope of a situation analysis such that a criticality of a present traffic situation, in particular with regard to the movement implemented in an uncontrolled manner, is determined.

If, at the predicted collision point in time $t_0$ or within a definable time window around $t_0$, no information with regard to the occurrence of the collision is present, wherein this query occurs in a fourth method step S4, and the vehicle passenger 3 has implemented an uncontrolled steering movement as a shock reaction to the incorrectly triggered passenger protection mechanism 1, in a fifth method step S5, measures are automatically initiated to compensate for the steering movement of the vehicle passenger 3 implemented in an uncontrolled manner.

Because the collision point in time $t_0$ is a calculation, the additional collision can take place shortly before or shortly after the calculated collision point in time. Therefore, the evaluation cannot only be implemented at the predicted collision point in time, but a defined time window must be monitored around the collision point in time $t_0$.

In particular, at least one intervention correcting the lane is automatically initiated. To correct the lane, an individual wheel braking occurs and/or an automatic steering intervention in a direction opposite the uncontrolled steering movement is implemented.

In a second method progression depicted in FIG. 3 for compensation of a steering movement implemented in an uncontrolled manner due to the incorrectly triggered passenger protection mechanism 1, the implementation of a situation analysis is provided in a sixth method step S6.

In the second method progression, in comparison to the method progression depicted in FIG. 2, the third method step S3 and the fourth method step S4 are exchanged, wherein it is first checked whether the collision has occurred and then the monitoring of the driver as a vehicle passenger 3 occurs with regard to his steering movements.

The situation analysis implemented in the sixth method step S6 is implemented in order to be able to targetedly implement a compensation, i.e. a correction, of the steering movement implemented as a shock reaction.

For this purpose, for example, depending on a lane width determined using detected signals of the environment sensor system, an evaluation of the present traffic situation is implemented. A criticality of the traffic situation is thereby determined.

If, for example, it is determined that the lane driven by the vehicle is comparatively wide, such that the uncontrolled steering movement of the vehicle passenger 3 in the form of the driver due to the incorrectly triggered passenger protection mechanism 1 has little to no effects for oncoming traffic, it is not required to implement the intervention correcting the lane abruptly in a comparatively quick reaction.

If the lane, however, is comparatively narrow and the driver as a vehicle passenger 3 implements an uncontrolled steering movement, in particular in the direction of oncoming traffic, then an immediate intervention correcting the lane is required in order to at least reduce the risk of a collision with oncoming traffic.

Additionally, by virtue of the detected signals of the environment sensor system, it can be determined whether oncoming traffic is located in an adjacent lane such that also here the intervention correcting the lane can be implemented depending on a presence of oncoming traffic.

The method is not limited to the passenger protection mechanism 1 in the form of the air cushion for moving the vehicle passenger 3 away from a collision side 6, but can be applied to all passenger protection mechanism 1 that are able to be triggered incorrectly which can be followed by a shock reaction.

Although the present invention has been described above by means of embodiments with reference to the enclosed drawings, it is understood that various changes and developments can be implemented without leaving the scope of the present invention, as it is defined in the enclosed claims.

The invention claimed is:

1. A method for operating a vehicle having at least one passenger protection mechanism which is controlled in the event of a detected collision which is imminent for the vehicle or in the event of a detected collision, wherein a driver sitting on a vehicle seat or a body part of the vehicle driver is moved by the triggered passenger protection mechanism, the method comprising:

monitoring a reaction of the driver of the vehicle following the triggering of the passenger protection mechanism; and responsive to the monitoring indicating that a steering movement is implemented in an uncontrolled manner by the driver, resulting from an incorrect triggering of the passenger protection mechanism, at least one lane correction intervention is automatically implemented to guide the vehicle back into its original lane.

2. The method of claim 1, wherein the lane correction intervention is an individual wheel braking or a steering intervention in a direction opposed to the steering movement implemented in an uncontrolled manner.

3. The method of claim 1, wherein the monitoring the reaction of the driver occurs within a defined time window around a point in time of the triggering of the passenger protection mechanism.

4. The method of claim 1, wherein a steering wheel angle, an angle speed, or an angle acceleration is continuously detected as a reaction of the driver.

5. The method of claim 4, wherein detected values of the steering wheel angle, the angle speed of the vehicle, or the angle acceleration of the vehicle are compared with a respective, stored threshold value to determine a steering movement implemented in an uncontrolled manner.

6. The method of claim 1, wherein the lane correction intervention is implemented depending on determined environment information.

7. The method of claim 1, wherein the lane correction intervention correcting the lane is implemented depending on a determined lane width.

8. The method of claim 1, wherein the lane correction intervention is implemented depending on a determined criticality of a driving situation caused by the steering movement implemented by the driver.

9. A method for operating a vehicle, comprising:

detecting that a collision is imminent for the vehicle or a collision of the vehicle;

in response to the detection, triggering a passenger airbag to move a driver sitting on a vehicle seat or a body part of the vehicle driver;

monitoring a reaction of the driver of the vehicle following the triggering of the passenger airbag; and automatically implementing a lane correction intervention to guide the vehicle back into its original lane in response to the monitoring indicating a steering movement is implemented in an uncontrolled manner by the driver, which results from an incorrect triggering of the passenger airbag.

10. The method of claim 9, wherein the lane correction intervention is an individual wheel braking or a steering intervention in a direction opposed to the steering movement implemented in an uncontrolled manner.

11. The method of claim 9, wherein the monitoring the reaction of the driver occurs within a defined time window around a point in time of the triggering of the passenger airbag.

12. The method of claim 9, wherein a steering wheel angle, an angle speed, or an angle acceleration is continuously detected as a reaction of the driver.

13. The method of claim 12, wherein detected values of the steering wheel angle, the angle speed of the vehicle, or the angle acceleration of the vehicle are compared with a respective, stored threshold value to determine a steering movement implemented in an uncontrolled manner.

14. The method of claim 9, wherein the automatically initiated intervention correcting the lane is implemented depending on determined environment information.

15. The method of claim 9, wherein the lane correction intervention is implemented depending on a determined lane width.

16. The method of claim 9, wherein the lane correction intervention is implemented depending on a determined criticality of a driving situation caused by the steering movement implemented by the driver.

* * * * *